United States Patent [19]

Bergstresser, Sr. et al.

[11] Patent Number: 5,111,426

[45] Date of Patent: May 5, 1992

[54] INSTRUCTIONAL DEVICE AND METHOD THEREOF

[76] Inventors: Arthur R. Bergstresser, Sr., 157 Edgewood Dr., Berea, Ohio 44017; Edward Craig, 338 Siena Ct., Oshawa, Ontario, Canada, L1J 6V5

[21] Appl. No.: 327,979

[22] Filed: Mar. 23, 1989

[51] Int. Cl.$^5$ .................................................. G06F 1/00;
[52] U.S. Cl. .............................. 395/600; 364/DIG. 2; 395/800
[58] Field of Search ... 364/200 MS File, 900 MS File, 364/492, 219, 98, 709.06; 340/712, 711

[56] References Cited

U.S. PATENT DOCUMENTS

| | | | |
|---|---|---|---|
| 4,503,426 | 3/1985 | Mikulski | 364/900 |
| 4,758,977 | 7/1988 | Morimoto et al. | 364/900 |
| 4,804,811 | 2/1989 | Raycher et al. | 364/219 |
| 4,835,730 | 5/1989 | Shimano et al. | 364/900 |
| 4,852,057 | 7/1989 | Patton | 364/709.06 |
| 4,868,376 | 9/1989 | Lessin et al. | 364/492 |
| 4,873,623 | 10/1989 | Lane et al. | 364/200 |

Primary Examiner—Douglas W. Olms
Assistant Examiner—T. Samuel
Attorney, Agent, or Firm—Pearne, Gordon, McCoy & Granger

[57] ABSTRACT

A hand-held instructional device and a method of data selection is disclosed. Indexed information is stored in ROM and retrieved to an LCD display. Retrieval is by pressing keys with associated indicia indicating broad subsets of the information, consulting a displayed index of the subset, and pressing further keys as indicated by the index to display the desired sub-area of the subset. Scrolling is provided to allow multiple screens of information to be reviewed. Both automatic and manual scrolling is used. An embodiment of the invention where the information stored is welding and cutting information is disclosed. A calculator operation is included to allow the user to manipulate the welding and cutting data for the job at hand.

9 Claims, 3 Drawing Sheets

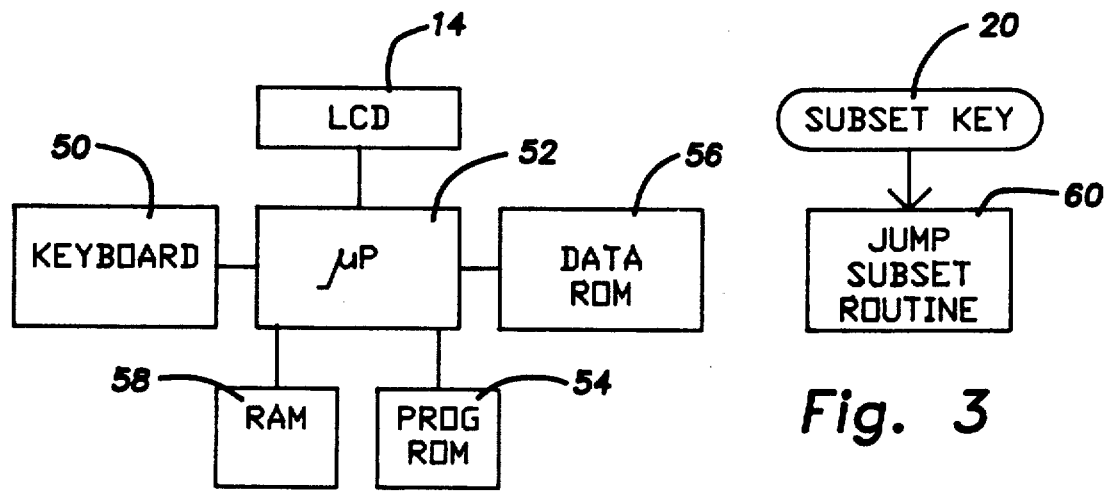
Fig. 2
Fig. 3
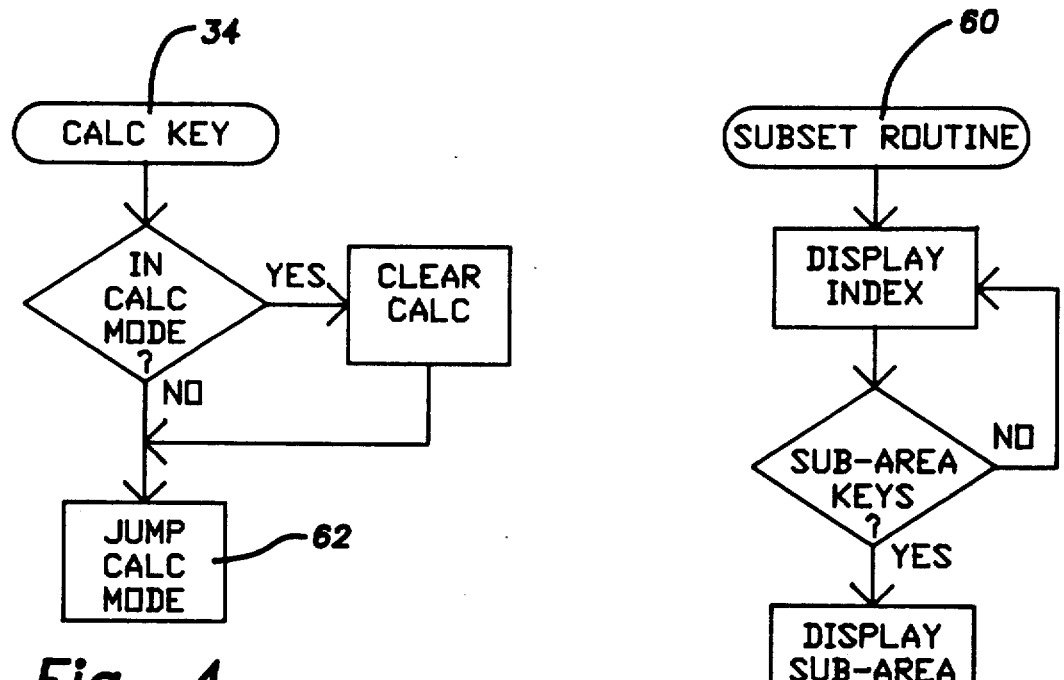
Fig. 4
Fig. 5

INSTRUCTIONAL DEVICE AND METHOD THEREOF

BACKGROUND OF THE INVENTION

The invention relates generally to a portable instructional device and a method for the display of a desired portion of a collection of information. In particular, the invention relates to the selection and display of a desired portion of a data base of welding and cutting information.

Numerous portable devices for the recall and display of stored information in response to keyboard entries are known in the art. In particular, electronic dictionaries and translators are well-known. U.S. Pat. Nos. 4,758,977 to Morimoto et al. and 4,503,426 to Mikulski are examples of these.

In any device containing a large amount of information, the main problem is providing the user with an interface to the information that allows rapid retrieval of the desired information. Without an efficient user interface, the device has little, if any, value over a conventional book containing the same information.

In electronic portable dictionaries and translators, this interface is fairly straight-forward as typically only a single known word is desired. Obviously, a system involving merely typing in the desired word may be used. Also, a bracketing method such as that taught in U.S. Pat. No. 4,758,977 may be employed, thus avoiding user entry of the word.

In U.S. Pat. No. 4,503,426, dedicated keys are provided for especially common word pairs (i.e. English-Spanish), as well as multipurpose keys that may be used either for direct entry of the text letter-by-letter or for selection of other common word pairs assigned to the particular key combination.

None of these techniques is very useful for the retrieval of textual type information because too many words must be used to adequately delineate the area of interest. In the case of text information, a more efficient technique is necessary.

The need for skilled workers in the steel fabricating and welding industry will likely continue to exceed the supply as the number of individuals entering the work force in the coming years declines. Yet, effective and efficient fabricating and welding skills will still be required. Unfortunately, the four-year apprenticeship program will be considered a luxury that few industries can afford.

What is needed is a quick and easy way for the workman (or other welding and cutting professional) to access the information needed for effective and efficient day-to-day performance. Voluminous handbooks and textbooks cannot provide the rapid, on-the-spot, answers needed.

The use of modern digital electronic information processing technology offers a possible solution to this problem, but only if a quick and efficient means for accessing the information is provided.

SUMMARY OF THE INVENTION

The present invention comprises a device and method for the retrieval and display of information.

The device includes an information storage means which may, for example, be read-only-memory (ROM), but may also be other storage devices such as those employing moving magnetic or optical media, magnetic bubbles, or non-volatile random-access-memory. Further, a display means is included which may, for example, be a liquid crystal display (LCD), but may also be of the light emitting diode, plasma, cathode ray tube, or printing type. Also included is a keyboard having a plurality of keys. In addition, there is a control means which may, for example, be a microprocessor with either on-board or separate ROM containing a control program, as well as associated RAM. In executing the control program, the microprocessor senses keys pushed and in response thereto retrieves selected information from the storage means and displays the information on the display. The device may advantageously be portable or hand-held.

The information of interest has previously been categorized into subsets and sub-areas of subsets and each subset has an index indicating the sub-areas of each subset. This information is stored in the storage means.

At least one of the keys is only operable to select display of the index of a particular subset of the information. The key has indicia on or located near to it that indicates the particular subset that is being selected. The displayed index indicates the keys to push to select a desired sub-area.

At least another one of said keys is operable to select display of a desired sub-area of the particular subset as indicated by the index. This sub-area selecting key also has associated indicia corresponding to the index entries.

The desired information is selected by pushing a dedicated subset key which results in the display of an index of the desired subset and then pushing one or more additional keys to select the desired sub-area of the subset as indicated by the index.

This allows rapid and efficient access to textual information with just a few key strokes. The information becomes available at the users fingertips instead of requiring time-consuming search of a conventional book.

To allow display of either indexes or the actual information that exceeds the capacity of the display device, a scrolling technique is preferably used. This scrolling may be either manual or automatic, and is preferably capable of both.

The device is preferably provided with scroll keys. A down scroll key selects the next portion of the index or information and an up scroll key selects the previous portion. These portions may advantageously be the next or previous screen-full of data in a screen oriented display.

In the case of automatic scrolling, either separate or preferably a single start and stop key is provided to alternately stop and start automatic display of the successive portions at established time intervals.

In a specific embodiment of the invention, welding and cutting information divided into subsets is stored in the information storage means. A particular subset is selected for display by pushing a dedicated subset key. Additionally, an index may be provided for each subset, the display of which is selected by pushing the respective subset key. One or more sub-area keys are pushed to select a desired sub-area based on the index.

This device provides a quick and easy way for a welding professional to access welding information that would otherwise be accessed through time-consuming manual search of a book. On-the-spot answers are instead provided.

To further enhance the utility of the welding and cutting information retrieved, the device may be provided with calculator functions by, for example, including a calculator program in the control means. It is of course possible to use a separate calculating circuit controlled by the control means.

By providing integrated calculating means, rapid and accurate manipulation of the data contained in the device may be achieved. Quantities may be easily scaled to the work at hand and estimates easily calculated.

DESCRIPTION OF THE DRAWINGS

FIG. 2 is a block diagram of the functional components of the invention.

FIG. 3 is a flow chart of the subset key interrupt handler for processing a push of one of the subset keys.

FIG. 4 is a flow chart of the calc key interrupt handler for processing a push of the calc key.

FIG. 5 is a flow chart of the subset routine for displaying an index and sub-areas for a subset.

DESCRIPTION OF THE PREFERRED EMBODIMENT

Figure 1:
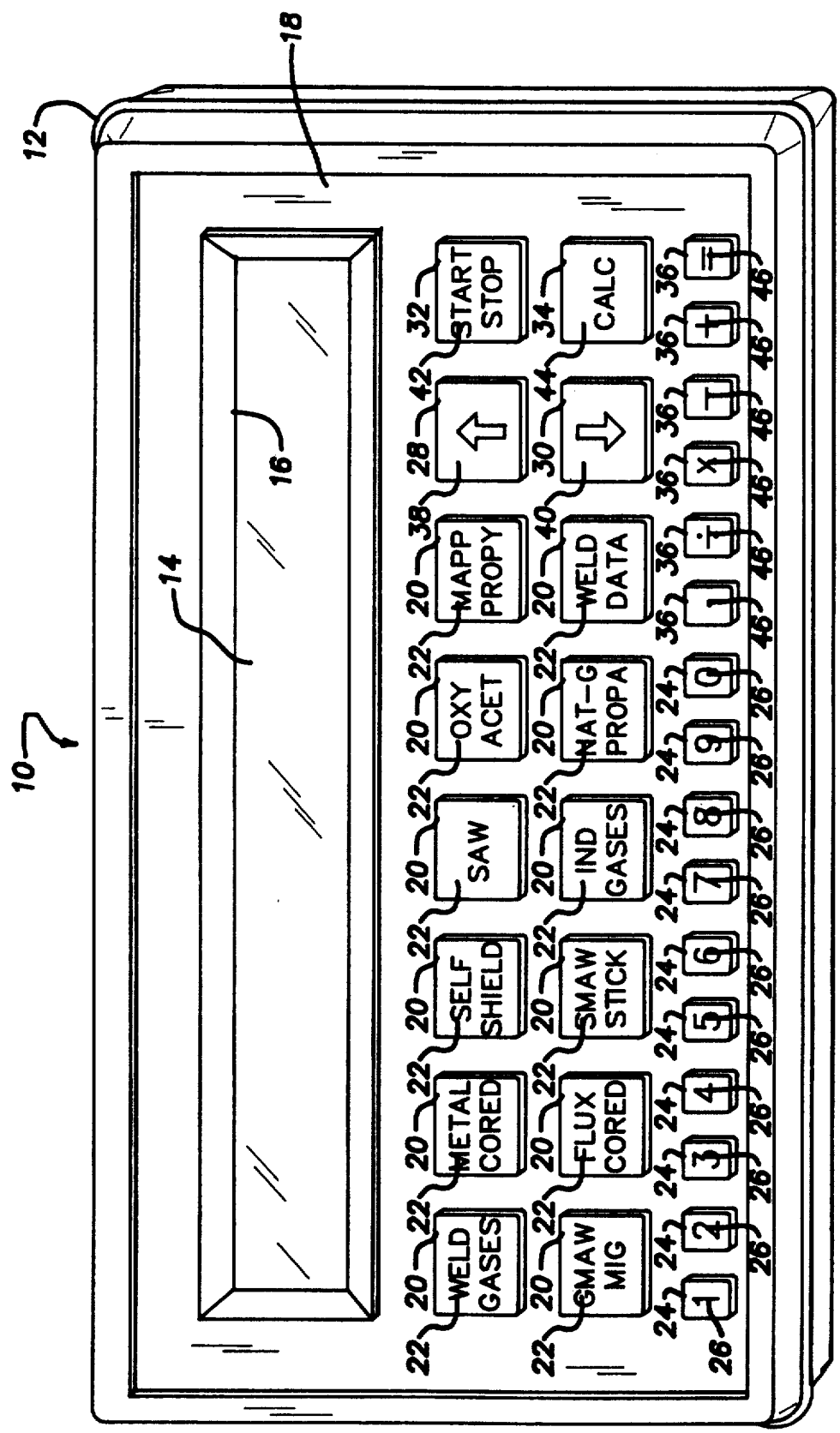
FIG. 1 is a perspective view of the invention as embodied in an instructional device for welding and cutting.

Referring to FIG. 1 an instructional device 10 according to the invention is shown. The components of device 10 are housed in a generally rectangular box-shaped case 12 which may be conveniently sized to be hand held. For example, the case measures approximately 7.5 inches by 4.0 inches by 1.34 inches. Device 10 is preferably powered by a battery (not shown) which may be of either the disposable or rechargeable type.

Display 14 is disposed within an opening or window 16 in the top surface 18 of case 12. Display 14 may, for example, be an LCD screen with the capability of displaying two lines of 32 characters each. A screen capable of displaying more characters may be used depending on factors of size, readability, cost and power required.

Subset keys 20 are disposed about top surface 18. Each subset key 20 has associated indicia 22 indicating a particular subset of information associated with that key. The indicia 22 may, for example, be located on the key 20. It is also possible to locate indicia 22 on top surface 18 adjacent to the key 20.

Sub-area keys 24 are also disposed about top surface 18. Each sub-area key 24 has associated indicia 26 corresponding to an index of a desired subset of information. The indicia 26 may, for example, be located on key 24. It is also possible to locate indicia 26 on top surface 18 adjacent to the key 24.

Scroll keys 28, 30 for up and down scrolling, respectively, start/stop key 32, calculator mode key 34 and calculator function keys 36 are also disposed on top surface 18, each key having associated indicia 38, 40, 42, 44, 46, respectively, of their function.

FIG. 2 is a functional block diagram of the preferred embodiment of device 10. Keyboard 50 comprises keys 20, 24, 28, 30, 32, 34, 36 and electrical switching means each responsive thereto. The switching means may, for example, be momentary contact switches operated by pushing a key.

The operation of microprocessor 52 is controlled by a program stored in program ROM 54. The necessary program would be within the abilities of one skilled in the art of programming microprocessor controlled devices in view of the disclosure provided herein. Microprocessor 52 monitors keyboard 50 for the operation of any of the keys 20, 24, 28, 30, 32, 34, 36. Based on the identity of the keys pushed, that is, a keyboard entry, microprocessor 52 retrieves information from data ROM 56 and displays the same on display 14 or performs calculations and displays the results on display 14. It is of course possible for program ROM 54 and data ROM 56 to be physically located in the same ROM. The ROM may, for example, be one or more 27C512 EPROM chips.

Microprocessor 52 uses RAM 58 to store temporary information that may be necessary for the execution of the program in program ROM 54 and to hold intermediate results of calculations. Microprocessor 52 may, for example, be a MSM80C31 chip with RAM 58 on-board the chip.

Information to be retrieved from device 10 is previously divided into subsets of information comprising logical groupings of related topics and stored in data ROM 56. For example, welding and cutting data may be divided into the following categories or subsets: weld gases, GMAW (MIG), metal cored, flux cored, self shield, SMAW stick weld, submerged arc weld, industrial gas, oxy-acetylene cutting, oxy-natural gas/-propane cutting, and oxy-mapppropylene data. Indica 22 are selected to represent, describe and/or suggest the description of a particular subset. This includes abbreviations, acronyms or visual representations, for example, "METAL CORED" for information on welding with metal cored wires. A particular subset may then be selected by pressing the key 20 having associated indicia 22 that represents, describes and/or suggests the particular subset.

If warranted by the quantity of information in a subset, each subset is previously further divided into sub-areas of information. For example, the metal cored subset of welding and cutting information may be divided into the following sub-areas: introduction, specifications and manufacture's designation, application selection, and procedures. The collection of the descriptions of the sub-areas then serve as an index for that subset when indica corresponding to indicia 26 are assigned to each sub-area description. This index is also stored in data ROM 56.

For example, indica 26 may be the numerals zero through nine. Then the index for metal cored could be as follows:
01 Metal Cored Introduction
02 Metal Cored Spec & Mfg's Designation
03 Metal Cored Application Selection
04 Metal Cored Procedure Data
where for instance 01 means push the sub-area key 24 having indicia 26 of "0" and the sub-area key 24 having indicia 26 of "1" to select the sub-area "Metal Cored Introduction." This case requires that two sub-area keys 24 be pressed to select a sub-area. An index could of course have as many entries as necessary by requiring more sub-area keys 24 to be pressed to select a sub-area. In the case of the numerals zero to nine, each additional sub-area key 24 would increase the possible sub-areas by a power of 10. If only ten or less entries were needed, only a single sub-area key 24 need be specified.

Use of the numerals zero through nine as indicia 26 has the further advantage of permitting sub-area keys 24 to also be used as numerical entry keys for calculator functions.

FIG. 3 is a flow chart of the interrupt handler for the subset keys 20. When one of the subset keys 20 is pressed, microprocessor 52 jumps to execute the subset routine.

FIG. 4 is a flow chart of the interrupt handler for the calculator key 34. When calculator key 34 is pressed, microprocessor 52 checks if device 10 is already functioning as a calculator, that is, in calculator mode. If device 10 is in calculator mode, any operands, results or pending calculator functions are cleared and microprocessor 52 jumps to execute calculator mode 62. If device 10 is not in calculator mode, microprocessor 52 jumps directly to execute calculator mode 62.

The interrupts of FIGS. 3 and 4 may be either hardware or software interrupts.

Referring to FIG. 5, a flow chart of subset routine 60 is shown. When executing subset routine 60, microprocessor 52 first displays on display 14 the index of the particular subset chosen according to which of the subset keys 20 were pressed. For example, if the subset key 20 with associated indicia 22 of "METAL CORED" was pressed, the index as described above for welding with metal cored wires would be displayed.

The index would continue to be displayed until the desired sub-area keys 24 (or a subset key 20 or calculator key 34) were pushed. For example, as described above, pushing the sub-area keys 24 having associated indicia 26 "0" and "1" instruct microprocessor 52 display on display 14 the sub-area indexed under "Metal Cored Introduction." Display of the selected sub-area would continue until a subset key 20 or calculator key 34 was pressed.

It is of course understood, that if a subset was small enough, no index would be needed and the subset could be directly displayed.

Figures 6, 7:
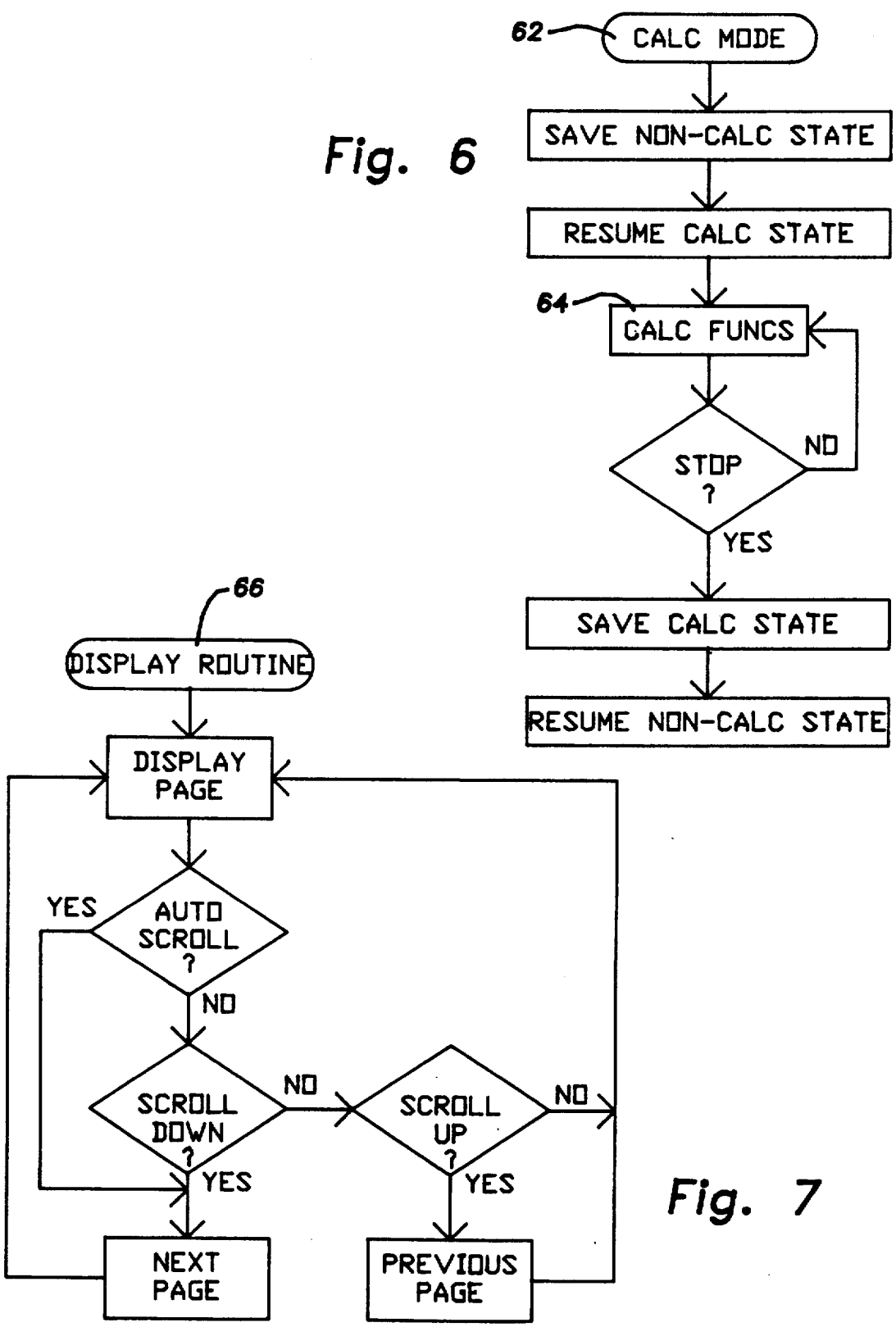
FIG. 6 is a flow chart of the calculator mode.
FIG. 7 is a flow chart of the display routine for scrolling between pages of data.

Referring to FIG. 6, a flow chart of calculator mode 62 is shown. When device 10 enters calculator mode 62 in response to pressing calculation key 34, the non-calculator mode state of device 10 is saved, that is, the particular subset and sub-area device 10 was displaying, if any, is saved in RAM 58.

Next, any previously saved state of calculation mode 62 is restored, that is, any previously saved operands, results and pending operations are restored.

At this point device 10 functions as a calculator. As is well-known in the art, calculator function keys 36 with associated indicia 46, such as ".", " ", "×", "−", "+", and "=" along with either additional numerical keys, or preferably with sub-area keys 20 having associated indicia 26 consisting of the numerals zero through nine, can be use in conjunction with microprocessor 52, RAM 58, a calculator routine in program ROM 54, and display 14 to provide calculator functions 64.

Device 10 remains in calculator functions 64 until stop/start key 32 (or subset keys 20 or calculator key 24) is pressed. If start/stop key 32 is pressed, the state of calculation mode 62, that is, operands, results and pending operations are saved in RAM 58. Next, the previously saved subset and sub-area, if any, are restored. Device 10 thus displays the same information it was displaying before calculator mode 62 was entered.

The saving and restoring of the calculator and non-calculator states allows the user to quickly retrieve information from a subset and use it in calculations or to quickly compare a calculation to values in a subset. This allows maximum use to be made of the information contained in device 10.

Because display 14 will typically have insufficient capacity to display all of either an index or a subset/sub-area, the display routine as shown in the flow chart of FIG. 7 may be advantageously provided. Whenever device 10 is displaying indexes or subsets/sub-areas, display routine 66 controls the portion of that information displayed on display 14.

The capacity of display 14 (or a smaller amount if overlap is desired) may be considered to be a page. Then all information to be displayed on display 14 may be considered as consisting of one or more pages.

Under display routine 66, microprocessor 52 causes display 14 to display a page of information. Initially, this will be the first such page.

Pressing start/stop key 32 toggles an automatic scrolling feature on and off (separate start and stop keys could of course be employed). If the automatic scrolling feature is on, the next page of information, if any, is displayed after a preset delay. Absent further keyboard entries, this continues until the last page is displayed on display 14.

Additionally, scroll up key 28 and scroll down key 30 are monitored by microprocessor 52. If scroll down key 30 is pushed, the next page, if any, is displayed. Of scroll up key 28 is pushed, the previous page, if any, is displayed. Use of scroll keys 28, 30 allow rapid movement to any portion of an index or subset/sub-area.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. In a portable electronic device for the display of reference information, said device having a digital data storage means containing said reference information, a keyboard having a plurality of keys, control means and display means, said keyboard, said digital data storage means and said display means being electrically connected to said control means, wherein said control means senses keys pushed and in response thereto retrieves a portion of said reference information from said digital data storage means and displays said portion of said reference information on said display means, said reference information being categorized into subsets and sub-areas of subsets, each subset having an index indicating the sub-areas of each subset, the improvement comprising:

at least one of said keys only operates to select display of the index of a particular subset of the reference information and has proximate indicia corresponding to the particular subset, said index further indicating by specific reference to specific indicia the keys to push to select the sub-areas;

at least another one of said keys operates to select display of a desired sub-area of the particular subset as indicated by the index and having proximate specific indicia corresponding to said index; and a start-and-stop key, wherein if said index or sub-area is larger than a page of the display means, said control means causes said display means to display a succession of page-sized parts of said index or sub-area, each part being displayed for a fixed delay time unless said start-and-stop key is pressed and said succession of parts continuing if said start-and-stop key is pressed again.

2. An electronic device for the display of welding and cutting reference information, said device comprising:
- a digital storage means containing said welding and cutting reference information;
- a keyboard having a plurality of keys, at least one of said keys corresponding to a particular subset of said welding and cutting reference information;
- display means; and
- control means, said control means being electrically connected to said storage means, keyboard and display means, whereby the particular subset may be displayed in response to pressing the at least one key.

3. A device as in claim 2, wherein said digital storage means is read only memory.

4. A device as in claim 2, wherein said display means is a liquid crystal display.

5. A device as in claim 2, wherein said control means comprises a microprocessor.

6. A device as in claim 2, wherein said at least one of said keys has proximate indicia having the characteristic of at least one of representing, describing and suggesting the particular subset.

7. A device as in claim 2, wherein the digital data storage means also contains an index for each subset indicating a plurality of sub-areas of the subsets the keyboard has an at least one key for each sub-area, the index of the particular subset is displayed in response to pressing the at least one said key and the desired sub-area is displayed in response to pressing the at least one associated key.

8. A device as in claim 2, further comprising calculator means, whereby a number displayed as part of a subset may be used in calculations to solve a user's particular welding and cutting problem.

9. A method for a user to select reference information to be displayed by a portable electronic device, said device having a digital data storage means containing said reference information, a keyboard having a plurality of keys, control means and display means, said keyboard, said digital data storage means and said display means being electrically connected to said control means, wherein said control means senses keys pushed and in response thereto retrieves a portion of said reference information from said digital data means and displays said portion of said reference information on said display means, said reference information being categorized into subsets and sub-areas of subsets, each subset having an index indicating the sub-areas of each subset, the method comprising:
- pushing a dedicated key to select display of the index of a particular subset of the reference information, said dedicated key having proximate indicia corresponding to the particular subset and said index further indicating the keys to push to select the sub-areas;
- pushing at least one more key to select display of a desired sub-area of the particular subset as indicated by the index, said at least one more key having proximate indicia corresponding to said index;
- pushing a start-and-stop key, wherein if said index or sub-area is larger than a page of the display means, said control means causes said display means to display a succession of page-sized parts of said index or sub-area, each part being displayed for a fixed delay time unless said start-and-stop key is pressed and said succession of parts continuing if said start-and-stop key is pressed again.

* * * * *